(12) United States Patent
Malet et al.

(10) Patent No.: US 11,142,641 B2
(45) Date of Patent: Oct. 12, 2021

(54) TRANSPARENT IMPACT-RESISTANT COMPOSITION

(71) Applicant: Arkema France, Colombes (FR)

(72) Inventors: Frédéric Malet, Lyons (FR); Mathieu Sabard, Serquigny (FR); Philippe Blondel, Bernay (FR); Yves Deyrail, Aviron (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/302,328

(22) PCT Filed: May 17, 2017

(86) PCT No.: PCT/FR2017/051192
§ 371 (c)(1),
(2) Date: Nov. 16, 2018

(87) PCT Pub. No.: WO2017/198949
PCT Pub. Date: Nov. 23, 2017

(65) Prior Publication Data
US 2019/0300707 A1    Oct. 3, 2019

(30) Foreign Application Priority Data

May 17, 2016    (FR) ...................................... 1654352

(51) Int. Cl.
| | | |
|---|---|---|
| C08L 77/02 | (2006.01) |
| C08F 12/08 | (2006.01) |
| C08F 36/06 | (2006.01) |
| C08F 36/08 | (2006.01) |
| C08L 9/06 | (2006.01) |
| C08L 77/06 | (2006.01) |
| C08G 69/40 | (2006.01) |

(52) U.S. Cl.
CPC .............. *C08L 77/02* (2013.01); *C08F 12/08* (2013.01); *C08F 36/06* (2013.01); *C08F 36/08* (2013.01); *C08L 9/06* (2013.01); *C08L 77/06* (2013.01); *C08G 69/40* (2013.01); *C08L 2203/12* (2013.01); *C08L 2203/16* (2013.01); *C08L 2205/035* (2013.01); *C08L 2205/18* (2013.01); *C08L 2207/53* (2013.01)

(58) Field of Classification Search
CPC ................. C08L 77/12; C08L 2207/53; C08L 51/00–08; C08L 55/02
See application file for complete search history.

(56) References Cited

U.S. PATENT DOCUMENTS

| | | | | |
|---|---|---|---|---|
| 5,512,631 A * | 4/1996 | Jalbert | ................... | C08F 265/04 525/66 |
| 6,296,920 B1* | 10/2001 | Buehler | ............... | C08G 63/181 428/101 |
| 2002/0173596 A1 | 11/2002 | Montanari et al. |
| 2002/0179888 A1 | 12/2002 | Montanari et al. |
| 2005/0165175 A1* | 7/2005 | Montanari | ............. | A63C 5/003 525/419 |
| 2005/0165210 A1 | 7/2005 | Malet et al. |
| 2007/0249789 A1 | 10/2007 | Buehler et al. |
| 2009/0149600 A1 | 6/2009 | Ness |
| 2009/0247699 A1 | 10/2009 | Buehler et al. |
| 2009/0318630 A1 | 12/2009 | Montanari et al. |
| 2010/0140846 A1 | 6/2010 | Montanari et al. |
| 2012/0157629 A1 | 6/2012 | Navarro et al. |
| 2014/0275392 A1 | 9/2014 | Bühler |
| 2016/0369098 A1 | 12/2016 | Yasuda et al. |

FOREIGN PATENT DOCUMENTS

| | | |
|---|---|---|
| EP | 0722961 A1 | 7/1996 |
| EP | 0787771 A1 | 8/1997 |
| EP | 1482011 A1 | 12/2004 |
| FR | 2846332 A1 | 4/2004 |
| JP | 2004346274 A | 12/2004 |
| JP | 2004352794 A | 12/2004 |
| JP | 2009-540087 A | 11/2009 |
| JP | 2012-126901 A | 7/2012 |
| WO | 2007144531 A2 | 12/2007 |
| WO | 2015132510 A1 | 9/2015 |
| WO | WO 2016/071409 A1 * | 5/2016 |

OTHER PUBLICATIONS

International Search Report (PCT/ISA/210) dated Sep. 14, 2017, by the European Patent Office as the International Searching Authority for International Application No. PCT/FR2017/051192.
Written Opinion (PCT/ISA/237) dated Sep. 14, 2017, by the European Patent Office as the International Searching Authority for International Application No. PCT/FR2017/051192.
Office Action (Notice of Reasons for Rejection) dated Dec. 22, 2020, by the Japanese Patent Office in corresponding Japanese Patent Application No. 2018-560599, and an English Translation of the Office Action. (10 pages).

* cited by examiner

*Primary Examiner* — Ana L. Woodward
(74) *Attorney, Agent, or Firm* — Buchanan Ingersoll & Rooney P.C.

(57) ABSTRACT

The invention relates to a composition comprising:
(A) an amorphous or quasi-amorphous copolymer containing polyamide blocks and containing polyether blocks, the polyamide blocks comprising cycloaliphatic units;
(B) a semicrystalline polymer or copolymer comprising amide units;
(C) another polymer or copolymer comprising amide units; and
(D) a multilayer polymer comprising at least a layer (D1) and a layer (D2).

This composition has advantageous properties of transparency and impact strength, especially for the manufacture of sports articles.

23 Claims, 1 Drawing Sheet

TRANSPARENT IMPACT-RESISTANT COMPOSITION

FIELD OF THE INVENTION

The present invention relates to a polymer composition having advantageous properties of transparency and impact strength, especially for the manufacture of sports articles.

TECHNICAL BACKGROUND

Transparent compositions based on polyamides that integrate impact strength additives are known in the prior art. Such compositions are described for example in documents US 2007/0249789, US 2009/0247699 and US 2014/0275392.

It is moreover known to produce mixtures comprising copolymers containing amide blocks and containing ether blocks in order to obtain favorable optical and mechanical properties.

For example, document WO 2007/144531 describes ternary mixtures of polyamides and block copolymers having particularly beneficial properties of transparency, of impact strength, of heat resistance and of chemical resistance.

Nonetheless, it has been observed that the properties of these products are degraded at low temperature, in particular the impact strength and the notch sensitivity.

There is therefore a need to provide compositions having improved properties at low temperature, especially impact strength and notch sensitivity properties, while also retaining the advantageous optical properties (transparency) and mechanical properties (flexural modulus) obtained with the products of document WO 2007/144531.

SUMMARY OF THE INVENTION

The invention relates first to a composition comprising:
(A) an amorphous or quasi-amorphous copolymer containing polyamide blocks and containing polyether blocks, the polyamide blocks comprising cycloaliphatic units;
(B) a semicrystalline polymer or copolymer comprising amide units;
(C) another polymer or copolymer comprising amide units; and
(D) a multilayer polymer comprising at least a layer (D1) and a layer (D2).

According to one embodiment, the composition comprises, by weight:
  from 15 to 50%, preferably from 20 to 40%, more preferentially from 25 to 35% and even more preferentially from 27 to 32% of copolymer (A);
  from 20 to 60%, preferably from 30 to 50%, more preferentially from 35 to 45% and even more preferentially from 38 to 42% of polymer (B);
  from 5 to 40%, preferably from 10 to 30%, more preferentially from 15 to 25% and even more preferentially from 18 to 23% of polymer (C); and
  from 1 to 25%, preferably from 2 to 20%, more preferentially from 3 to 15% and even more preferentially from 5 to 12% of polymer (D).

According to one embodiment, the polymer (D) is in the form of core-shell particles, the layer (D1) being the core layer and the layer (D2) being a shell layer of the particles, and preferably the outermost shell layer.

According to one embodiment:
  the layer (D1) of the polymer (D) is a layer of polymer that comprises at least 50% by weight of units derived from isoprene or from butadiene; and/or
  the layer (D2) of the polymer (D) is a layer of (meth) acrylic polymer, preferably comprising at least 70% by weight of units derived from C1 to C12 alkyl (meth) acrylates, and even more preferably comprising at least 80% by weight of units derived from C1 to C4 alkyl methacrylate and/or C1 to C8 alkyl acrylate.

According to one embodiment, the layer (D1) of the polymer (D) has a glass transition temperature less than or equal to 0° C. and the layer (D2) of the polymer (D) has a glass transition temperature greater than or equal to 60° C.

According to one embodiment, the polyamide blocks of the copolymer (A) are formed with a predominance by weight of an equimolar combination of at least one cycloaliphatic diamine and of at least one dicarboxylic acid, preferably a linear aliphatic dicarboxylic acid.

According to one embodiment, the cycloaliphatic diamine is selected from bis(3-methyl-4-aminocyclohexyl)methane (BMACM), para-aminodicyclohexylmethane (PACM), isophoronediamine (IPD), bis(4-aminocyclohexyl)methane (BACM), 2,2-bis(3-methyl-4-aminocyclohexyl)propane (BMACP), 2,6-bis(aminomethyl)norbomane (BAMN) and combinations thereof, and is preferably bis(3-methyl-4-aminocyclohexyl)methane.

According to one embodiment, the aliphatic dicarboxylic acid is selected from aliphatic dicarboxylic acids having from 6 to 36 carbon atoms, preferably from 9 to 18 carbon atoms, in particular from 1,10-decanedicarboxylic acid, 1,12-dodecanedicarboxylic acid, 1,14-tetradecanedicarboxylic acid and 1,18-octadecanedicarboxylic acid.

According to one embodiment, the polyamide blocks of the copolymer (A) are selected from B.6, B.9, B.10, B.12, B.14, B.16, B.18 blocks and mixtures or copolymers thereof.

According to one embodiment, the polyamide blocks of the copolymer (A) comprise a number-average molecular weight of 500 to 12 000 g/mol, preferably from 2000 to 6000 g/mol.

The number-average molecular weight (or number-average molar mass) is set by the content of chain limiter. It may be calculated according to the equation:

$$Mn = (n_{monomer}/n_{limiter}) * M_{repeating\ unit} + M_{limiter}$$

$n_{monomer}$=number of moles of monomer
$n_{limiter}$=number of moles of diacid in excess
$M_{repeating\ unit}$=molar mass of repeating unit
$M_{limiter}$=molar mass of diacid in excess According to one embodiment, the polyether blocks of the copolymer (A) comprise units derived from at least one polyalkylene ether polyol, especially a polyalkylene ether diol, preferably selected from polyethylene glycol (PEG), polypropylene glycol (PPG), polytrimethylene glycol (PO3G), polytetramethylene glycol (PTMG), and mixtures thereof or copolymers thereof.

According to one embodiment, the polyether blocks of the copolymer (A) comprise a number-average molecular weight of 200 to 4000 g/mol, preferably from 300 to 1100 g/mol.

According to one embodiment, the polymer or copolymer (B) is a copolymer comprising amide units, and preferably a copolymer containing polyamide blocks and containing polyether blocks.

According to one embodiment, the polyamide blocks of the copolymer (B) are selected from PA 12, PA 11, PA 10.10, PA 10.12, PA 10.14, PA 6.10, PA 6.12, PA 6.14 and PA 6.18 blocks, PA 12 blocks being preferred.

According to one embodiment, the polyether blocks of the copolymer (B) comprise units derived from at least one polyalkylene ether polyol, especially a polyalkylene ether diol, preferably selected from polyethylene glycol (PEG), polypropylene glycol (PPG), polytrimethylene glycol (PO3G), polytetramethylene glycol (PTMG), and mixtures thereof or copolymers thereof.

According to one embodiment, the constituent (C) is an amorphous copolyamide or homopolyamide and is preferably a B.14 homopolyamide.

According to one embodiment, the composition comprises, in addition to the constituents (A) to (D), one or more additives, preferably selected from antistatic agents, dyes, stabilizers such as heat stabilizers and UV stabilizers, nucleating agents, plasticizers, agents for improving impact strength and reinforcing agents.

According to one embodiment, the sum of the constituents (A) to (D) represents at least 90% by weight, preferably at least 95% by weight, more preferentially at least 98% by weight and even more preferentially at least 99% by weight of the composition.

The invention also relates to a process for producing a composition as described above, comprising a step of mixing the constituents (A), (B), (C) and (D), preferably in the molten state, and a step of extrusion or of injection.

The invention also relates to an article consisting of the composition described above, or comprising a part consisting of the composition described above.

According to one embodiment, the article is selected from a fiber, a fabric, a film, a sheet, a rod, a tube and an injected part.

According to one embodiment, the article is a sports article, such as an element of a sports shoe, sports equipment such as ice skates, ski bindings, rackets, sports bats, boards, horseshoes, fins, golf balls, or recreational or do-it-yourself articles, or highway tools or pieces of equipment; or protective articles such as visors for helmets, glasses or side arms for glasses; or vehicle components, such as headlight protectors, rear view mirrors, tanks, in particular for cars, mopeds, motorbikes or scooters.

The present invention makes it possible to overcome the disadvantages of the state of the art. More particularly, it provides polymer compositions having advantageous optical properties (transparency) and mechanical properties (flexural modulus), with better impact strength and notch sensitivity at low temperature.

This is accomplished by virtue of the addition of a multilayer polymer (D) to a mixture of polymers or copolymers (A), (B), and (C). The polymer (D) especially improves the properties of impact strength at low temperature, while retaining the other advantageous properties, especially of transparency or of flexural modulus, afforded by the mixture of (A), (B) and (C).

DESCRIPTION OF EMBODIMENTS OF THE INVENTION

Figure 1:
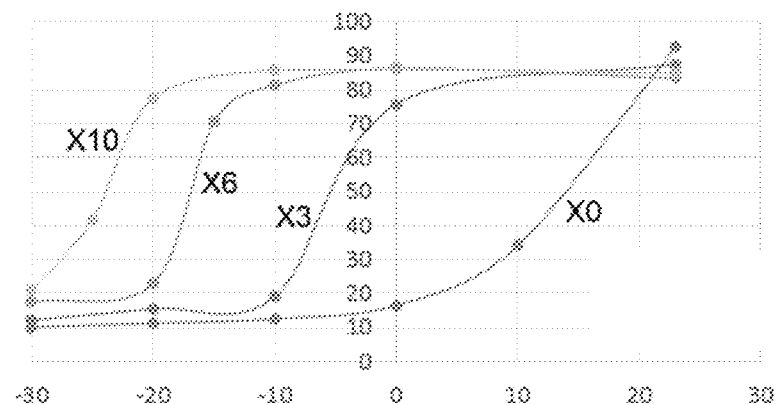
FIG. 1 illustrates the Charpy impact strength of samples X0, X3, X6 and X10 defined in example 1. The temperature in ° C. is on the x-axis and the resilience in $kJ/m^2$ is on the y-axis.

The invention is now described in greater detail and in a nonlimiting manner in the description which follows.

The composition of the invention comprises the polymers or copolymers (A), (B), (C), and (D).

Constituent (A)

The constituent (A) is an amorphous or quasi-amorphous copolymer containing polyamide blocks and containing polyether blocks, the polyamide blocks comprising cycloaliphatic units.

It is preferably amorphous.

"Amorphous" is intended to mean a polymer which only has a glass transition temperature (Tg) and not a melting point (Mp).

"Quasi-amorphous" is intended to mean a relatively non-crystalline polymer having a glass transition temperature (Tg) and a melting point (Mp) such that the enthalpy of crystallization during the step of cooling at a rate of 20° K/min in differential scanning calorimetric analysis, measured according to standard ISO 11357-3: 2013, is less than 30 J/g, preferably less than 20 J/g, more preferably still less than 15 J/g.

The glass transition temperature (Tg) measured by DSC at a heating rate of 20° K/min according to standards ISO 11357-1: 2009 and ISO 11357-2: 2013 is preferably greater than 75° C. More preferably still, the constituent (A) has a glass transition temperature at least equal to 90° C.

The constituent (A) is preferably transparent, that is to say that it has a transmittance greater than 75% at 560 nm over a 2 mm thick plate.

The polyamide (PA) blocks may consist predominantly of a (preferably equimolar) combination of at least one diamine and of at least one dicarboxylic acid, the diamine(s) being predominantly cycloaliphatic and the dicarboxylic acid(s) being predominantly linear and aliphatic, the amide units being able to optionally comprise, in a minor amount, at least one other polyamide comonomer.

"Predominantly" is intended to mean at an amount of more than 50% by weight. "In a minor amount" is intended to mean at an amount less than 50% by weight.

According to a preferred embodiment, the PA blocks consist entirely of a cycloaliphatic diamine and of a dicarboxylic acid, preferably a linear dicarboxylic acid (without minority comonomer).

The cycloaliphatic diamine(s) may advantageously be selected from bis(3-methyl-4-aminocyclohexyl)methane (BMACM), para-aminodicyclohexylmethane (PACM), isophoronediamine (IPD), bis(4-aminocyclohexyl)methane (BACM), 2,2-bis(3-methyl-4-aminocyclohexyl)propane (BMACP) and 2,6-bis(aminomethyl)norbornane (BAMN).

Advantageously, just one cycloaliphatic diamine, in particular BMACM, is used as diamine.

At least one non-cycloaliphatic diamine may also be included in the composition of the monomers of the amide units, preferably at an amount of at most 30 mol % relative to the total of the diamines. As non-cycloaliphatic diamine, mention may be made of linear aliphatic diamines such as 1,4-tetramethylenediamine, 1,6-hexamethylenediamine, 1,9-nonamethylenediamine and 1,10-decamethylenediamine.

The aliphatic dicarboxylic acid(s) may preferably be selected from aliphatic dicarboxylic acids having from 6 to 36 carbon atoms, preferably from 9 to 18 carbon atoms, in particular 1,10-decanedicarboxylic acid (sebacic acid), 1,12-dodecanedicarboxylic acid, 1,14-tetradecanedicarboxylic acid and 1,18-octadecanedicarboxylic acid.

At least one non-aliphatic dicarboxylic acid may be included in the composition of the monomers of the amide units, preferably at an amount of at most 15 mol % relative to the total of the dicarboxylic acids. The non-aliphatic dicarboxylic acid is preferably selected from aromatic diacids, in particular isophthalic acid (I), terephthalic acid (T), and mixtures thereof.

One or more monomers may be included in a minor amount in the preparation of the amide units. They may especially be selected from lactams and α,ω-aminocarboxylic acids.

The lactam is for example selected from caprolactam, oenantholactam and lauryllactam.

The α,ω-aminocarboxylic acid is for example selected from aminocaproic acid, 7-aminoheptanoic acid, 11-aminoundecanoic acid or 12-aminododecanoic acid.

Advantageously, the constituent (A) includes amide units in which the number of carbons per amide is on average at least equal to 9.

The PA blocks are preferably selected from PA B.6, PA B.9, PA B.10, PA B.12, PA B.14, PA B.16 or PA B.18 blocks and mixtures thereof.

In the notation PA X.Y, X represents the number of carbon atoms derived from the diamine residues and Y represents the number of carbon atoms derived from the diacid residues (conventionally), when these are numbers. The letter B represents the residue derived from the diamine BMACM.

The number-average molecular weight of the PA blocks is advantageously between 500 and 12 000 g/mol, preferably between 2000 and 6000 g/mol.

The polyether units of the polyether (PE) blocks are for example derived from at least one polyalkylene ether polyol, especially a polyalkylene ether diol, preferably selected from polyethylene glycol (PEG), polypropylene glycol (PPG), polytrimethylene glycol (PO3G), polytetramethylene glycol (PTMG), and mixtures thereof or copolymers thereof.

The PE blocks may comprise polyoxyalkylene blocks bearing $NH_2$ chain ends, such sequences being able to be obtained by cyanoacetylation of α,ω-dihydroxylated aliphatic polyoxyalkylene blocks referred to as polyether diols. More particularly, use may be made of the products referred to as Jeffamine® (for example Jeffamine® D400, D2000, ED 2003, XTJ 542), commercial products from Huntsman. Reference is made in this regard to documents JP 2004346274, JP 2004352794 and EP 1482011.

The number-average molecular weight of the PE blocks is advantageously between 200 and 4000 g/mol, preferably between 300 and 1100 g/mol.

The copolymer (A) may be prepared for example by the method according to which:

in a first step, the PA blocks are prepared by polycondensation
of the diamine(s);
of the dicarboxylic acid(s); and
where appropriate, of the comonomer(s) selected from lactams and α,ω-aminocarboxylic acids;
in the presence of a chain limiter selected from dicarboxylic acids; then
in a second step, the PA blocks obtained are reacted with the PE blocks in the presence of a catalyst.

The general two-step preparation method for the copolymers of the invention is known and described, for example, in documents FR 2846332 and EP 1482011.

The reaction for forming the PA block may especially be carried out at a temperature from 180 to 300° C., preferably from 200 to 290° C. The pressure in the reactor is preferably set at between 5 and 30 bar and preferably maintained for approximately 2 to 3 hours. It is then possible to slowly reduce the pressure of the reactor to atmospheric pressure and then distill off the excess water, for example over one or two hours.

Once the PA block bearing carboxylic acid ends has been prepared, the PE block and a catalyst may then be added. The PE block may be added in one or more portions, as may the catalyst. According to an advantageous form, the PE block is first added; the reaction of the OH ends of the PE block and of the COOH ends of the PA block begins with the formation of ester bonds and the elimination of water. As much water as possible is eliminated from the reaction medium by distillation and the catalyst is then introduced to complete the bonding of the PA blocks and the PE blocks. This second step may be carried out with stirring, preferably under a vacuum of at least 15 mmHg (2000 Pa) at a temperature such that the reagents and the copolymers obtained are in the molten state. By way of example, this temperature may be between 100 and 400° C. and usually between 200 and 300° C. The reaction is monitored by measuring the torque exerted by the molten polymer on the stirrer or by measuring the electrical power consumed by the stirrer. The end of the reaction is determined by the target torque or power value.

It is also possible to add, during synthesis, at the moment deemed to be the most opportune, one or more molecules used as antioxidant, for example the commercial products Irganox® 1010 or Irganox® 245.

It also possible to carry out a process for preparing the copolymer (A) in which all the monomers are brought together from the start, i.e. in a single step, to carry out the polycondensation:
of the diamine(s);
of the dicarboxylic acid(s); and
where appropriate, of the other polyamide comonomer(s);
in the presence of a chain limiter selected from dicarboxylic acids;
in the presence of the PE blocks; and
in the presence of a catalyst for catalyzing the reaction between the PE blocks and the PA blocks.

Advantageously, said dicarboxylic acid is used as chain limiter, introduced in excess relative to the stoichiometry of the diamine(s).

Advantageously, a derivative of a metal selected from the group formed of titanium, zirconium and hafnium, or a strong acid such as phosphoric acid, hypophosphorous acid or boric acid, is used as catalyst.

The polycondensation may especially be carried out at a temperature from 240 to 280° C.

The copolymer (A) may comprise hydrophilic PE blocks, preferably PE blocks of PEG, PPG or PO3G type, which provides an extra advantage in terms of antistatic and waterproof/breathable (that is to say, allowing the passage of water vapor but not of liquid water) properties to the composition.

According to another particularly preferred embodiment, the copolymer (A) is a copolymer containing B.12 blocks and containing PTMG blocks.

Constituent (B)

The constituent (B) is a semicrystalline polymer or copolymer comprising amide units.

"Semi-crystalline" is intended to mean a polymer which has a melting point (Mp) in DSC according to standard ISO 11357-3 of 2013, and an enthalpy of crystallization during the step of cooling at a rate of 20° K/min in DSC measured according to standard ISO 11357-3 of 2013 which is greater than 30 J/g, preferably greater than 40 J/g.

The constituent (B) may especially be a polyamide or a copolyamide.

The constituent (B) advantageously has a melting point greater than 100° C., preferably greater than 150° C., measured by DSC according to standard ISO 11357-3: 2013.

The constituent (B) advantageously has a glass transition temperature less than 65° C., measured by DSC at a heating rate of 20° K/min according to standards ISO 11357-1: 2009 and ISO 11357-2: 2013.

The constituent (B) preferably comprises amide units and ether units. The amide units are preferably aliphatic or predominantly (by weight) aliphatic.

Even more preferably, the constituent (B) is a copolymer containing PA blocks and containing PE blocks.

The amide units may be formed predominantly (by weight) from a lactam or from an α,ω-aminocarboxylic acid, and/or from an equimolar combination of at least one diamine and of at least one dicarboxylic acid, the diamine(s) preferably being predominantly (by weight) aliphatic and linear, the amide units being able to optionally comprise, but in a minor amount (by weight), at least one other polyamide comonomer.

The constituent (B) may advantageously include amide units of linear aliphatic nature in which the number of carbons per amide is on average at least equal to 9.

The constituent (B) may thus comprise linear aliphatic PA blocks, especially selected from PA 12, PA 11, PA 10.10, PA 10.12, PA 10.14, PA 6.10, PA 6.12, PA 6.14 and PA 6.18 blocks.

The notation PA X.Y has already been recalled above. In the notation PA X, X represents the number of carbon atoms derived from amino acid residues.

The PE units may especially be selected from those indicated above in relation to constituent (A), advantageously being of the same nature and/or having a similar number-average molecular weight (to within 50%, preferably to within 20% or to within 10%).

Advantageously, the amide units of the constituent (B) represent at least 50% by weight of said constituent.

Advantageously, the ether units of the constituent (B) represent at least 15% by weight of said constituent.

When the constituent (B) is a polyamide, it may especially be selected from PA 12 and PA 11, or optionally from PA 10.10, PA 10.12, PA 10.14, PA 6.10, PA 6.12, PA 6.14 and PA 6.18.

When the constituent (B) is a copolyamide, preferably a block copolyamide, the amide units (preferably the amide blocks) are preferably selected from PA 12 and PA 11, or optionally from PA 10.10, PA 10.12, PA 10.14, PA 6.10, PA 6.12, PA 6.14 and PA 6.18.

According to a preferred embodiment, the constituent (B) is a copolymer containing PA 12 blocks and containing PTMG blocks.

Constituent (C)

The constituent (C) is a polymer or copolymer comprising amide units, which is different from the constituent (A) and the constituent (B).

It may in particular be an amorphous copolyamide or homopolyamide, and preferably an amorphous homopolyamide.

It may especially be selected from aliphatic polyamides and cycloaliphatic polyamides.

A mixture of several polyamides or copolyamides may be used for the constituent (C).

According to a preferred embodiment, the constituent (C) (or, when the constituent (C) is a mixture of polymers, at least one of said polymers) comprises at least one unit corresponding to the formula Ca diamine.Cb diacid.

The repeating unit Ca diamine.Cb diacid is a unit obtained from the polycondensation of at least one linear or branched aliphatic diamine, or of at least one cycloaliphatic diamine or of a mixture of two or more thereof and of at least one aliphatic dicarboxylic acid or of at least one cycloaliphatic dicarboxylic acid.

The molar proportions of diamine and of dicarboxylic acid are preferentially stoichiometric.

The diamine and also the dicarboxylic acid each comprise from 4 to 36 carbon atoms and, advantageously, from 6 to 18 carbon atoms.

The aliphatic diamine used to obtain this repeating unit Ca diamine.Cb diacid is as defined above for the diamine X.

The cycloaliphatic diamine may be selected for example from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl) butane, bis(3-methyl-4-aminocyclohexyl)methane or 3'-dimethyl-4,4'-diaminodicyclohexylmethane commonly referred to as "BMACM" or "MACM" (and denoted B hereinafter), p-bis(aminocyclohexyl)methane commonly referred to as "PACM" (and denoted P hereinafter), isopropylidenedi(cyclohexylamine) commonly referred to as "PACP", isophoronediamine (denoted IPD hereinafter) and 2,6-bis(aminomethyl)norbornane (commonly referred to as "BAMN").

A nonexhaustive list of these cycloaliphatic diamines is given in the publication "*Cycloaliphatic Amines*" (Encyclopedia of Chemical Technology, Kirk-Othmer, 4th Edition (1992), pp. 386-405).

The dicarboxylic acid may be selected from linear or branched aliphatic dicarboxylic acids or cycloaliphatic dicarboxylic acids.

When the dicarboxylic acid is aliphatic and linear, it is as defined above for the diacid Y.

When the dicarboxylic acid is cycloaliphatic, it may comprise the following carbon backbones: norbomylmethane, cyclohexane, cyclohexylmethane, dicyclohexylmethane, dicyclohexylpropane, di(methylcyclohexyl) or di(methylcyclohexyl)propane.

As examples of preferred homopolyamides, mention may be made of: PA B.10, PA P.10, PA B.12, PA P.12, PA B.14, PA P.14, PA B.18 and PA P.18.

As examples of preferred copolyamides, mention may be made of: PA 11/B.10, PA 11/P.10, PA 11/B.12, PA 11/P.12, PA 11/B.14, PA 11/P.14, PA 11/B.18, PA 11/P.18, PA 12/B.10, PA 12/P.10, PA 12/B.12, PA 12/P.12, PA 12/B.14, PA 12/P.14, PA 12/B.18, PA 12/P.18, PA 10.10/B.10, PA10.10/P.10, PA 10.10/B.12, PA 10.10/P.12, PA 10.10/B.14, PA 10.10/P.14, PA 10.10/B.18, PA 10.10/P.18, PA 10.12/B.10, PA 10.12/P.10, PA 10.12/B.12, PA 10.12/P.12, PA 10.12/B.14, PA 10.12/P.14, PA 10.12/B.18, PA 10.12/P.18, PA, 12.10/B.10, PA 12.10/P.10, PA 12.10/B.12, PA 12.10/P.12, PA 12.10/B.14, PA 12.10/P.14, PA 12.10/B.18, PA 12.10/P.18, PA 12.12/B.10, PA 12.12/P.10, PA 12.12/B.12, PA 12.12/P.12, PA 12.12/B.14, PA 12.12/P.14, PA 12.12/B.18, PA 12.12/P.18, PA 10.14/P.10, PA 10.14/B.12, PA 10.14/P.12, PA 10.14/B.14, PA 10.14/P.14, PA 10.14/B.18, PA 10.14/P.18, PA 12.14/B.10, PA 12.14/P.10, PA 12.14/B.12, PA 12.14/P.12, PA 12.14/B.14, PA 12.14/P.14, PA 12.14/B.18, PA 12.14/5 P.18, PA P.10/B.10, PA P.12/B.12, PA P.14/B.14, PA 11/P.10/B.10, PA 11/P.12/B.12, PA 11/P.14/B.14, PA 12/P.10/B.10, PA 12/P.12/B.12 and PA 12/P.14/B.14.

According to a preferred embodiment, the constituent (C) is a PA B.14 polyamide.

Constituent (D)

The constituent (D) is a multilayer polymer comprising at least a layer (D1) and a layer (D2). The layers (D1) and (D2) are of different composition.

Optionally, other layers (D3, etc.), may also be present.

Such a polymer may be formed sequentially by a multi-step polymerization process, and preferably by a multi-step emulsion polymerization process culminating in the formation at least of the layer (D1) comprising a first polymer and of the layer (D2) comprising a second polymer.

Thus, the second polymer is formed by emulsion polymerization in the presence of the first polymer in emulsion.

The multilayer polymer according to the invention preferably comprises between 0 and 50% by weight of units comprising an aromatic group.

The multilayer polymer is preferably in the form of essentially spherical polymer particles. These particles are also referred to as "core-shell" particles. The first layer (D1) forms the core, the second layer (D2) or all the subsequent layers form the respective shell or shells.

The particles preferably have a weight-average size from 20 nm to 500 nm, preferably from 30 nm to 400 nm, even more preferably from 50 nm to 350 nm, even more advantageously from 75 nm to 300 nm and ideally from 100 to 200 nm.

Preferably, the layer (D1) comprises a polymer having a glass transition temperature less than or equal to 0° C. and the layer (D2) comprises a polymer having a glass transition temperature greater than or equal to 60° C., the layer (D2) being arranged externally relative to the layer (D1). The polymer of the layer (D1) preferably has a glass transition temperature less than or equal to −5° C., even more preferably less than or equal to −15° C., advantageously less than or equal to −25° C. The polymer of the layer (D2) preferably has a glass transition temperature of 60 to 150° C.

The polymer having a glass transition temperature less than or equal to 0° C. in the layer (D1) may especially be produced during a first step of a multi-step process, forming the core of the multilayer polymer particles; the polymer having a glass transition temperature greater than or equal to 60° C. may especially be produced during a final step of a multi-step process, forming the external (outermost) layer of the multilayer polymer particles.

One or more additional intermediate layers obtained by one or more intermediate steps may be present.

The layer (D1) of the constituent (D) preferably comprises from 0% by weight to less than 50% by weight of units containing aromatic groups. The layer (D2) of the constituent (D) preferably comprises from 0% by weight to less than 50% by weight of units containing aromatic groups.

According to one embodiment, the layer (D2) does not comprise units containing aromatic groups.

Regarding the polymer of the layer (D1) having a glass transition temperature less than 0° C., this polymer preferably comprises at least 50% by weight of units derived from isoprene or from butadiene. It is preferred that this layer (D1) be the innermost layer (the core) of the multilayer polymer particles.

In particular, this may be isoprene homopolymers or butadiene homopolymers, isoprene/butadiene copolymers, isoprene copolymers with at most 98% by weight of a vinyl monomer and butadiene copolymers with at most 98% by weight of a vinyl monomer. The vinyl monomer may be styrene, an alkylstyrene, acrylonitrile, an alkyl (meth)acrylate or butadiene or isoprene or mixtures thereof, the polymer of the layer (D1) preferably comprising less than 50% by weight of monomers containing aromatic groups.

The polymer of the layer (D1) may be crosslinked. Crosslinking monomers of use in the present invention comprise, without being limited thereto, polyfunctional vinylaromatic compounds such as divinylbenzene and divinyltoluene, polyhydric alcohols such as ethylene glycol dimethacryate and 1,3-butanediol diacrylate, trimethacrylates, triacrylates, allyl carboxylates such as allyl acrylate and allyl methacrylate, and di- and triallyl compounds such as diallyl phthalate, diallyl sebacate and triallyl triazine.

According to one embodiment, the core is a butadiene homopolymer.

According to another embodiment, the core is a butadiene/styrene copolymer.

Even more preferably, the glass transition temperature of the polymer of the layer (D1) comprising at least 50% by weight of polymeric units derived from isoprene or from butadiene is between −100° C. and 10° C., even more preferably still between −80° C. and 0° C. and advantageously between −70° C. and −20° C.

Regarding the polymer of the layer (D2), mention may be made of homopolymers and copolymers formed from monomers containing double bonds and/or vinyl monomers. Preferably, the polymer of the layer (D2) is a (meth)acrylic polymer.

Preferably, the polymer of the layer (D2) comprises at least 70% by weight of monomers selected from C1 to C12 alkyl (meth)acrylates. Even more preferably still, it comprises at least 80% by weight of C1 to C4 alkyl methacrylate monomers and/or of C1 to C8 alkyl acrylate monomers.

Most preferably of all, the acrylic or methacrylic monomers of the polymer of the layer (D2) are selected from methyl acrylate, ethyl acrylate, butyl acrylate, methyl methacrylate, ethyl methacrylate, butyl methacrylate and mixtures thereof, as long as the polymer of the layer (D2) has a glass transition temperature of at least 60° C.

The polymer of the layer (D2) may comprise units derived from functional monomers selected from glycidyl (meth) acrylate, acrylic or methacrylic acid, amides derived from these acids, such as for example dimethacrylamide, 2-methoxyethyl acrylate or methacrylate, 2-aminoethyl acrylates or methacrylates and mixtures thereof.

Advantageously, it comprises at least 70% by weight of units derived from methyl methacrylate.

Preferably, the glass transition temperature of this polymer is between 60° C. and 150° C. The glass transition temperature of the polymer is even more preferably between 80° C. and 150° C., advantageously between 90° C. and 150° C. and more advantageously between 100° C. and 150° C.

Preferably, the polymer of the layer (D2) is grafted to the polymer of the layer (D1).

According to certain embodiments, the polymer of the layer (D2) is crosslinked.

The multilayer polymer may be obtained by a multi-step process, comprising at least two steps. Such a process is described for example in documents US 2009/0149600 or EP0722961.

Preferably, the polymer of the layer (D1) having a glass transition temperature less than 0° C. is produced in the first step of the multi-step process.

Preferably, the polymer of the layer (D2) having a glass transition temperature greater than 60° C. is produced after the step of producing the polymer of the layer (D1).

Even more preferably, the polymer of the layer (D2) having a glass transition temperature greater than 60° C. produced during the step (B) forms the external layer of the polymer particle with a multilayer structure. Additional intermediate steps may be present, leading to the formation of intermediate layers.

In order to more easily estimate and measure the individual glass transition temperatures of the respective polymers of the respective layers, it is possible to produce samples of the respective polymers alone and not by a multi-step process.

The weight ratio of the polymer of the layer (D1) to the complete multilayer polymer is preferably at least 60% by weight, preferably at least 70% by weight, even more preferably at least 75% by weight.

The weight ratio of the polymer of the layer (D2) to the complete multilayer polymer is preferably at least 5% by weight, preferably at least 6% by weight, even more preferably at least 7% by weight. This ratio is preferably at most 30% by weight.

Preferably, the ratio between the polymer of the layer (D1) and the complete multilayer polymer is between 5% by weight and 30% by weight.

The term "(meth)acrylic" as used above denotes any type of acrylic and methacrylic monomers.

The term "(meth)acrylic polymer" as used above indicates that the (meth)acrylic polymer comprises essentially polymers comprising (meth)acrylic monomers that constitute 50% by weight or more of the (meth)acrylic polymer.

In one embodiment, the multilayer polymer is of core-shell type, based on methacrylates, butadiene and styrene (MBS copolymer).

Composition According to the Invention

The composition according to the invention may comprise one or more additives.

It may for example be supplemented with antistatic additives and/or additives making it possible to increase the compatibility for mixing with other polymers.

Other customary additives may be selected from dyes, stabilizers such as heat stabilizers and UV stabilizers, nucleating agents, plasticizers, agents for improving impact strength and reinforcing agents, said additive(s) preferably having a refractive index close to that of constituents (A), (B), (C) and (D).

The composition preferably has a glass transition temperature greater than 75° C.

The melting point of the composition is preferably greater than 100° C., more preferentially greater than 150° C.

The composition is preferably transparent, that is to say that its transmittance at 560 nm over a 2 mm thick plate is greater than 75%.

In order to prepare the composition according to the present invention, it is possible to mix the constituents (A), (B), (C), and (D) in granule form, this mixture then being injected at a temperature of between 230 and 330° C. on an injection press to obtain the desired objects and test specimens.

It is also possible to mix the constituents (A), (B), (C), and (D) in the molten state, in particular in an extruder, at a temperature of between 230 and 330° C., so as to recover them in the form of granules which will then be injected at a temperature of between 230 and 330° C. on an injection press to obtain the desired objects and test specimens.

Some constituents may be mixed with one another, or with additives, before being mixed with the other constituents and/or additives.

Each constituent (A), (B), (C) and (D) is preferably a single constituent. Nonetheless, it is also possible in some cases to use two or more than two constituents for each of the categories.

The total content of additives in the composition is preferably less than or equal to 10%, 9%, 8%, 7%, 6%, 5%, 4%, 3%, 2% or 1% by weight.

The content by weight of constituent (D) in the (total) composition may especially be: from 1 to 2%, or from 2 to 3%, or from 3 to 4%, or from 4 to 5%, or from 5 to 6%, or from 6 to 7%, or from 7 to 8%, or from 8 to 9%, or from 9 to 10%, or from 10 to 12%, or from 12 to 14%, or from 14 to 16%, or from 16 to 18%, or from 18 to 20%, or from 20 to 25%.

The content by weight of constituent (A) relative to the sum (A)+(B)+(C) may especially be: from 5 to 60%; preferably from 10 to 50%; more preferably from 20 to 40%; more preferably from 25 to 38%, more preferably from 30 to 35%; and more preferably approximately 32%.

The content by weight of constituent (B) relative to the sum (A)+(B)+(C) may especially be: from 10 to 70%; preferably from 20 to 65%; more preferably from 30 to 60%; more preferably from 35 to 55%, more preferably from 40 to 50%; and more preferably approximately 45%.

The content by weight of constituent (C) relative to the sum (A)+(B)+(C) may especially be: from 2 to 50%; preferably from 5 to 40%; more preferably from 10 to 35%; more preferably from 15 to 30%, more preferably from 20 to 25%; and more preferably approximately 23%.

Applications

Another subject of the invention is an especially transparent or translucent fashioned article, such as fiber, fabric, film, sheet, rod, tube or injected part, comprising the composition as defined above, which may be produced in the form of a dry mix or after compounding on an extruder.

Thus, the composition according to the present invention is advantageous for the easy manufacture of articles, in particular sports articles or elements of sports articles which have especially to have good transparency, good impact strength and good resistance to mechanical, chemical, UV or heat attacks. Among these sports articles, mention may be made of elements of sports shoes, which may especially be cleated shoes such as soccer boots, rugby boots, football boots, running shoes, ski boots or hockey shoes; sports equipment such as ice skates or other articles for winter sports and mountaineering, ski bindings, rackets, sports bats, boards, horseshoes, fins, golf balls, recreational vehicles, in particular those intended for cold weather activities.

Mention may also be made, generally, of recreational or do-it-yourself articles, or highway tools or pieces of equipment that are subjected to weather and mechanical attacks; protective articles such as visors for helmets, glasses and also side arms for glasses; shoulder protectors, elbow protectors, back protectors, hand protectors, knee protectors, shin protectors, especially helmets, gloves, shoulder pads, elbow pads or knee pads. Mention may also be made, by way of nonlimiting examples, of vehicle components, such as headlight protectors, rear view mirrors, small parts for all-terrain cars, tanks, in particular for mopeds, motorbikes or scooters, subjected to mechanical and chemical attacks, PMMA screws and bolts, cosmetic articles subject to mechanical and chemical attacks, lipstick containers, pressure gauges or attractive protective elements such as gas bottles.

EXAMPLES

The following examples illustrate the invention without limiting it.

In the compositions X0 X3 X6 and X10 tested in the examples:

A: copolymer containing B.12 blocks (Mn: 2000 g/mol) and containing PTMG blocks (Mn: 650 g/mol)

B: copolymer containing PA 12 blocks (Mn 4000 g/mol) and containing PTMG blocks (Mn 1000 g/mol)

C: polyamide B.14

D: multilayer core-shell type polymer based on methacrylates, butadiene and styrene: MBS copolymer synthesized according to US 2009/149600 or EP 0722961. The multilayer polymer D is synthesized according to example 1 of US 2009/149600 as first layer and according to example 6 as second layer, in order to obtain a multilayer MBS polymer.

|   | X0 | X3 | X6 | X10 |
|---|----|----|----|-----|
| A | 32 | 31 | 30.1 | 28.8 |
| B | 44.6 | 43.3 | 41.9 | 40.1 |
| C | 23.4 | 22.7 | 22 | 21.1 |
| D | 0 | 3 | 6 | 10 |

Example 1

Samples of compositions according to the invention (X3, X6, X10) containing 3%, 6% and 10% by weight, respectively, of constituent (D), and of a comparative composition (X0) devoid of constituent (D), were processed by a compounding process:

on a Leistritz-type twin screw extruder;
at a flow rate of 15 kg/h;
at a screw speed of 300 rpm;
according to a flat temperature profile of 255° C.

The samples were then transformed by injection molding. The injection temperature was fixed at 270° C. and the mold temperature at 40° C.

Example 2

The following properties of the samples produced in example 1 are tested:

Charpy impact strength after 15 days of conditioning at 23° C. and with 50% relative humidity, according to standard ISO 1791eA (notched bars);

notch sensitivity, evaluated at −10° C., −20° C. and −30° C. and −40° C. at different speeds by a three-point flexural test on notched bars (after conditioning for 15 days at 23° C. and 50% relative humidity); this test makes it possible to measure a ductile-brittle transition rate at a given temperature;

flexural modulus according to standard ISO 178 after 15 days of conditioning at 23° C. and 50% relative humidity;

transmittance at 560 nm on 2 mm plate (measured according to standard ISO 13468-2:2006) and haze (measured according to standard D1003-97).

The impact strength results are illustrated in FIG. 1. They demonstrate that the polymer (D) makes it possible to significantly offset the ductile-brittle transition towards low temperatures.

The notch sensitivity results are summarized in the table below:

| Sample | Behavior at 2000 mm/min | D-B transition (rate) |
|--------|-------------------------|------------------------|
| X0 | ductile at −10° C. | 1200 mm/min at −20° C. |
| X3 | ductile at −20° C. | 1600 mm/min at −30° C. |
| X6 | ductile at −30° C. | 1700 mm/min at −40° C. |
| X10 | ductile at −40° C. | — |

It is observed that the addition of the polymer D makes it possible to make the product less sensitive to fine notches.

The flexural modulus results are summarized in the table below:

|  | Sample | | | |
|---|---|---|---|---|
|  | X0 | X3 | X6 | X10 |
| Flexural modulus (MPa) | 670 | 630 | 615 | 590 |

It is observed that the addition of the polymer D has a small impact on the flexural modulus.

Figure 2:
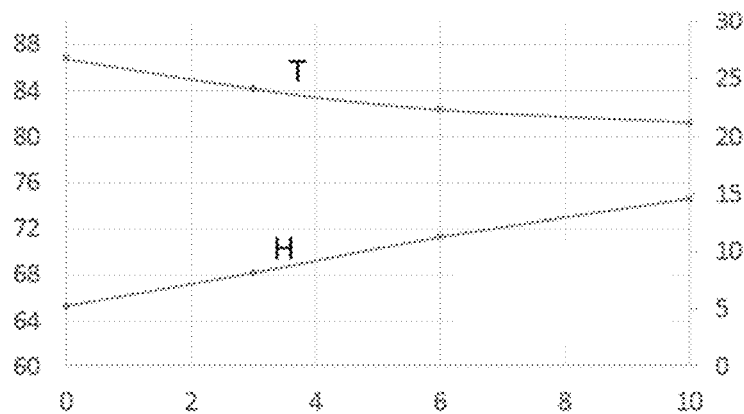
FIG. 2 illustrates the transmittance T at 560 nm (in %, on the left-hand y-axis) and the haze H (in %, on the right-hand y-axis) as a function of the content of polymer (D) (in %, on the x-axis) in the composition.

The transmittance and haze results are illustrated in FIG. 2.

It is observed that the addition of the polymer D has a small impact on the optical properties.

The invention claimed is:

1. A composition comprising:
   (A) an amorphous or quasi-amorphous copolymer containing polyamide blocks and containing polyether blocks, the polyamide blocks comprising cycloaliphatic units;
   (B) a semicrystalline polymer comprising amide units or copolymer comprising amide units;
   (C) another polymer comprising amide units or copolymer comprising amide units; and
   (D) a multilayer polymer comprising at least a layer (D1) and a layer (D2), and
   wherein the composition exhibits an impact strength greater than 80 kJ/m² at 23° C. and a transmittance greater than 75% at 560 nm over a 2 mm thick plate.

2. The composition as claimed in claim 1, comprising, by weight:
   from 15 to 50% of copolymer (A), relative to the sum of (A)+(B)+(C);
   from 20 to 60% of polymer (B), relative to the sum of (A)+(B)+(C);
   from 5 to 40% of polymer (C), relative to the sum of (A)+(B)+(C); and
   from 1 to 25% of polymer (D), based on the total weight of the composition.

3. The composition as claimed in claim 1, wherein the polymer (D) is in the form of core-shell particles, the layer (D1) being the core layer and the layer (D2) being a shell layer of the particles.

4. The composition as claimed in claim 1, wherein:
   the layer (D1) of the polymer (D) is a layer of polymer that comprises at least 50% by weight of units derived from isoprene or from butadiene; and/or
   the layer (D2) of the polymer (D) is a layer of (meth)acrylic polymer.

5. The composition as claimed in claim 1, wherein the layer (D1) of the polymer (D) has a glass transition temperature less than or equal to 0° C. and the layer (D2) of the polymer (D) has a glass transition temperature greater than or equal to 60° C.

6. The composition as claimed in claim 1, wherein the polyamide blocks of the copolymer (A) are formed with a predominance by weight of an equimolar combination of at least one cycloaliphatic diamine and of at least one dicarboxylic acid.

7. The composition as claimed in claim 6, wherein the cycloaliphatic diamine is selected from bis(3-methyl-4-aminocyclohexyl)methane (BMACM), para-aminodicyclohexylmethane (PACM), isophoronediamine (IPD), bis(4-aminocyclohexyl)methane (BACM), 2,2-bis(3-methyl-4-aminocyclohexyl)propane (BMACP), 2,6-bis(aminomethyl)norbornane (BAMN) and combinations thereof.

8. The composition as claimed in claim 6, wherein the dicarboxylic acid is selected from aliphatic dicarboxylic acids having from 6 to 36 carbon atoms.

9. The composition as claimed in claim 1, wherein the polyamide blocks of the copolymer (A) are selected from PA B.6, PA B.9, PA B.10, PA B.12, PA B.14, PA B.16, PA B.18 blocks and mixtures or copolymers thereof.

10. The composition as claimed in claim 1, wherein the polyamide blocks of the copolymer (A) comprise a number-average molecular weight of 500 to 12 000 g/mol.

11. The composition as claimed in claim 1, wherein the polyether blocks of the copolymer (A) comprise units derived from at least one polyalkylene ether polyol.

12. The composition as claimed in claim 1, wherein the polyether blocks of the copolymer (A) comprise a number-average molecular weight of 200 to 4000 g/mol.

13. The composition as claimed in claim 1, wherein the polymer or copolymer (B) is a copolymer comprising amide units.

14. The composition as claimed in claim 13, wherein the copolymer (B) comprises polyamide blocks selected from PA 12, PA 11, PA 10.10, PA 10.12, PA 10.14, PA 6.10, PA 6.12, PA 6.14 and PA 6.18 blocks.

15. The composition as claimed in claim 13, wherein the copolymer (B) comprises polyether blocks comprising units derived from at least one polyalkylene ether polyol.

16. The composition as claimed in claim 1, wherein the constituent (C) is an amorphous copolyamide or homopolyamide.

17. The composition as claimed in claim 1, comprising, in addition to the constituents (A) to (D), one or more additives.

18. The composition as claimed in claim 1, wherein the sum of the constituents (A) to (D) represents at least 90% by weight of the composition.

19. A process for producing a composition as claimed in claim 1, comprising a step of mixing the constituents (A), (B), (C) and (D) and a step of extrusion or of injection.

20. An article consisting of the composition as claimed in claim 1 or comprising a part consisting of the composition.

21. The article as claimed in claim 20, selected from a fiber, a fabric, a film, a sheet, a rod, a tube and an injected part.

22. The article as claimed in claim 20, wherein the article is a sports article, a recreational article, a do-it-yourself article, a highway tool, a piece of equipment, a protective article or a vehicle component.

23. The composition as claimed in claim 1, wherein the composition exhibits an impact strength below 94 kJ/m$^2$ at 23° C.

* * * * *